US010223343B2

(12) United States Patent
Kleinferchner (10) Patent No.: US 10,223,343 B2
(45) Date of Patent: Mar. 5, 2019

(54) METHOD FOR PROVIDING SELECTION OVERLAYS ON ELECTRONIC CONSUMER CONTENT (71) Applicant: GoEssential Inc., San Francisco, CA (US)

(72) Inventor: Christian Kleinferchner, Salzburg (AT)

(73) Assignee: GoEssential Inc., San Francisco, CA (US)

( * ) Notice: Subject to any disclaimer, the term of this patent is extended or adjusted under 35 U.S.C. 154(b) by 0 days.

(21) Appl. No.: 15/073,522

(22) Filed: Mar. 17, 2016

(65) Prior Publication Data

US 2016/0275060 A1 Sep. 22, 2016

Related U.S. Application Data (60) Provisional application No. 62/134,522, filed on Mar. 17, 2015, provisional application No. 62/142,710, filed on Apr. 3, 2015.

(51) Int. Cl.
G06F 17/20 (2006.01)
G06F 17/24 (2006.01)
G06F 17/30 (2006.01)

(52) U.S. Cl.
CPC ...... *G06F 17/241* (2013.01); *G06F 17/30011* (2013.01); *G06F 17/3089* (2013.01); *G06F 17/30126* (2013.01)

(58) Field of Classification Search
CPC .................................................. G06F 17/241
See application file for complete search history.

(56) References Cited

U.S. PATENT DOCUMENTS

| 6,279,014 | B1 * | 8/2001 | Schilit | G06F 17/218 715/200 |
| 7,363,589 | B1 * | 4/2008 | Maeng | G06Q 10/10 715/719 |
| 2007/0208994 | A1 * | 9/2007 | Reddel | G06F 17/2288 715/205 |
| 2009/0087160 | A1 * | 4/2009 | Lui | G06F 17/241 386/282 |
| 2011/0010397 | A1 * | 1/2011 | Kathpal | G06F 17/241 707/802 |
| 2012/0284197 | A1 * | 11/2012 | Sitrick | G06Q 10/0631 705/301 |
| 2013/0262973 | A1 | 10/2013 | Patterson et al. | |

(Continued)

OTHER PUBLICATIONS

International Search Report and Written Opinion PCT/US2016/025914 dated Jul. 28, 2016, pp. 1-7.

*Primary Examiner* — Keith D Bloomquist
(74) *Attorney, Agent, or Firm* — Perkins Coie LLP (57) ABSTRACT Disclosed is a method and system for applying summaries to electronic content by generating an Essence Layer File which includes user generated annotations highlighting important parts of given electronic content. The Essence Layer file is applied on top of and is anchored to the electronic content rather than editing the saved file that the electronic content is stored as. Essence Layer Files paired with electronic content are streamed to consumers through both direct and social network distribution systems. The consumers rate the value of the summaries thereby creating a crowd-sourced merit system.

11 Claims, 12 Drawing Sheets (56) References Cited

U.S. PATENT DOCUMENTS

2014/0047308 A1    2/2014   Chub et al.
2014/0101527 A1    4/2014   Suciu
2014/0279893 A1*   9/2014   Branton ............ G06F 17/30994
                                                                                      707/634

* cited by examiner

METHOD FOR PROVIDING SELECTION OVERLAYS ON ELECTRONIC CONSUMER CONTENT

CROSS REFERENCE TO RELATED APPLICATIONS

This application claims priority to U.S. Provisional Patent Application No. 62/134,522 entitled "METHOD FOR PROVIDING SELECTION OVERLAYS ON ELECTRONIC CONSUMER CONTENT" filed Mar. 17, 2015 and U.S. Provisional Patent Application No. 62/142,710 having the same title and filed on Apr. 3, 2015. The 62/134,522 application and 62/142,710 application are incorporated by reference in their entirety.

TECHNICAL FIELD teachings relate to consuming and enriching electronic content on web enabled devices and sharing it over the Internet and more specifically to consuming web pages, PDFs and eBooks (ePubs), videos and audio recordings on PCs and mobile devices, enriching such content with special annotations, and sharing such enriched content or annotations via the Internet and social media channels.

BACKGROUND

When electronic content of any form is consumed by a person interested in gathering information, only a fraction of that content is really relevant. The rest is not essential to understand the highlights or core of the content. Therefore, consuming content can be very ineffective and tiring, because people have to read/browse/scan though irrelevant passages. Experience shows that in average less than 20% of available content is relevant or essential to a consumer.

Accordingly, there is a need for a system and method for tools and services to enable consumers to "essentialize" electronic content as a community and create a ranking system for the summaries generated by members of the community so that people can easily identify and directly consume the relevant parts of electronic content through both personal and crowd-sourced rating schemes.

SUMMARY embodiments contemplate a variety of improved methods and systems for enriching and consuming electronic content on PCs and mobile devices.

Embodiments include methods and systems for enabling a community of users to receive electronic content, generate an Essence Layer File which includes annotations and highlights to the electronic content mapped to overlay on top of the electronic content, and publish the Essence Layer File with the electronic content to the Internet.

Additional elements include providing for a personal and community rating system for the Essence Layer Files generated by individual users. Further elements include a plurality of importance levels for highlights, user libraries, a community stream for essenced electronic content, and generating brief summaries of electronic content.

BRIEF DESCRIPTION OF THE FIGURES

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

At the core of Essentializing System is the Essence concept. An "Essence" always is based on an "existing electronic content" and is created by a person (the "essencer" or "creator") who is analyzing said existing content and who is defining a "set of annotations", a "purpose message", an "identifying image", a "list of tags". An Essence can also have an "Essence discussion stream". Several Essences can be grouped together into a "Collection" of Essences. Essences can be generated for numerous types of electronic content such as HTML (Web pages), PDF, eBooks, Videos (Youtube, MP4, etc), Audio recordings (MP3, streaming formats, etc), Text documents, Emails, and other suitable electronic document formats. For the purposes of this disclosure the term "essencer" refers to a person creating an Essence. An Essence always has a link to the essencer.

Figure 1:
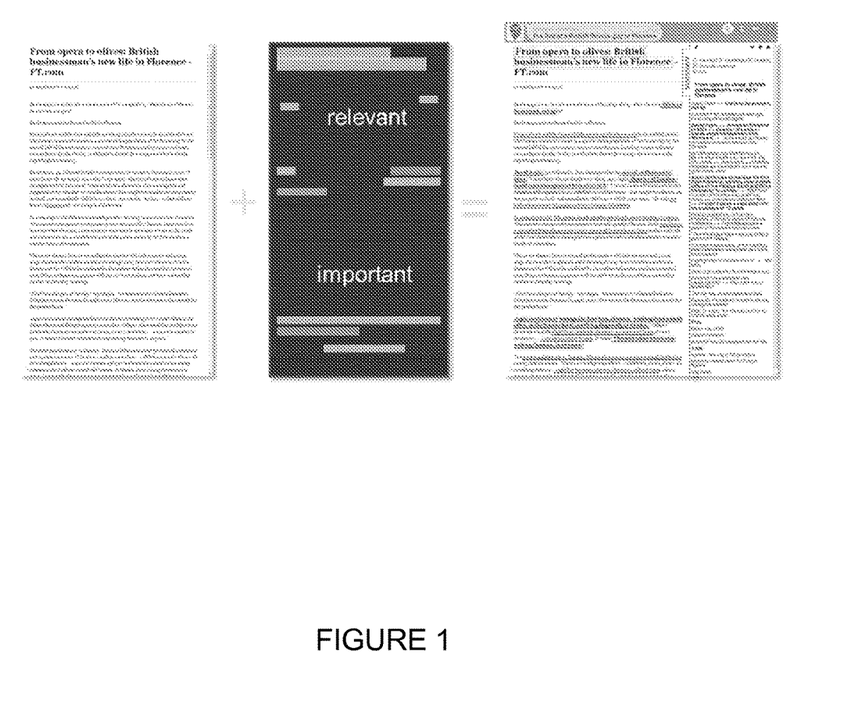
FIG. 1 illustrates the combination of an original document with an Essence Layer File.

Referring now to FIG. 1, a combination of an original document with an Essence Layer File. An original document (shown left) is combined with an Essence Layer File (shown mid) to create and essenced document (shown right). The Essence Layer File is a set of annotations. An "annotation" refers to an element of electronic content (e.g. a piece of text, an image, or a piece of video) and can contain one or more of the following: A highlight marking the content (the highlight can have different colors), an importance level that ranks the annotation relative to other annotations, levels for "agreement" and "disagreement" and also for "do not understand", a multi-media comment created by essencer, or such a comment can also contain links to web resources, external documents, other annotations, or other Essences. An Essence Layer File can be applied and stripped from an original document according to viewer specifications. Further multiple Essence Layer Files can be layered on top of a single original document.

An essenced document includes the essence annotations along with the original document. An essenced document would also include an identifying image selected by essencer from the list of images of electronic content or it can be an animated image combining all multiple images or video clip (e.g. an animated GIF). Essenced documents would further include a purpose message created by the essencer and is a multi-media comment. Such a comment can also contain links to web resources, external documents, annotations in the Essence, or other Essences. Essenced documents include an Essence discussion stream and sorting tags.

Figure 2:
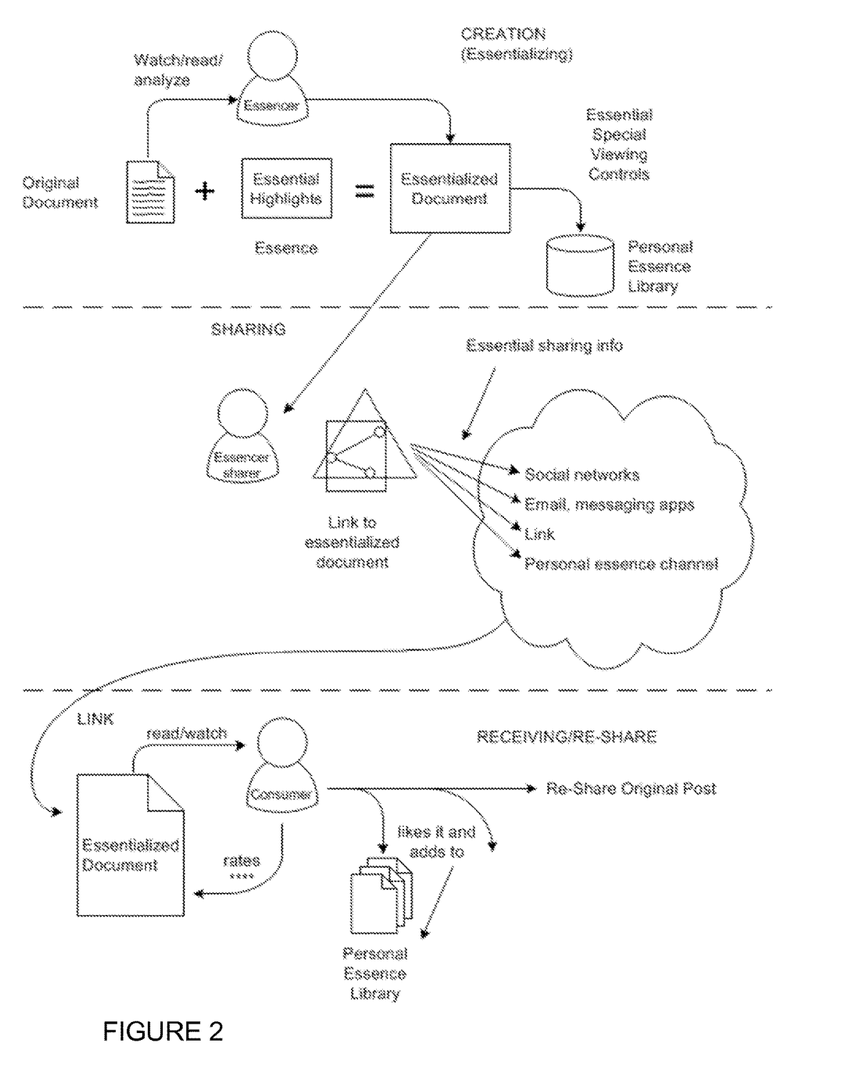
FIG. 2 illustrates community action utilizing Essence Layer Files.

Referring now to FIG. 2, FIG. 2 illustrates community action utilizing Essence Layer Files. To begin, an essencer watches, reads or analyzes original electronic content and then generates an Essence and applies the Essence to the original electronic content to create and essenced document. The essencer will have additional editorial controls over the generated essence, and may save the Essence in a personal library. The essencer can further share the Essence with others. Thus the essenced document can be shared over social networks, email, messaging applications, direct links, personal channels (such as a YouTube channel), or other suitable methods to disseminate electronic content known in the art. The essenced document is shared with consumers who then read, watch, analyze the essenced document and may provide a rating for the specific Essence, or Essences, in case there are multiple Essences layered on a single original electronic content. The Essence rating system then ranks the Essences that have been shared to a public database such that higher ranked ones would be placed higher in search results such that more popular essencers would receive a greater number of views and the community as a whole would receive the highest quality summaries of the content that mattered to them.

The rating system could allow for personal rating to matter more than average community ratings such that a given consumer would be able to tailor the experience to that consumer's particular preferences. Further different kinds of content could be categorized separately into sub-content such that community rating pertained to a relevant sub-community viewing the given content. An illustrative example of sub-content would be U.S. court opinions, and legal blogs; while the sub-community would consist of lawyers and legal professionals who cared about concise summaries of said opinions and blogs.

Figure 3:
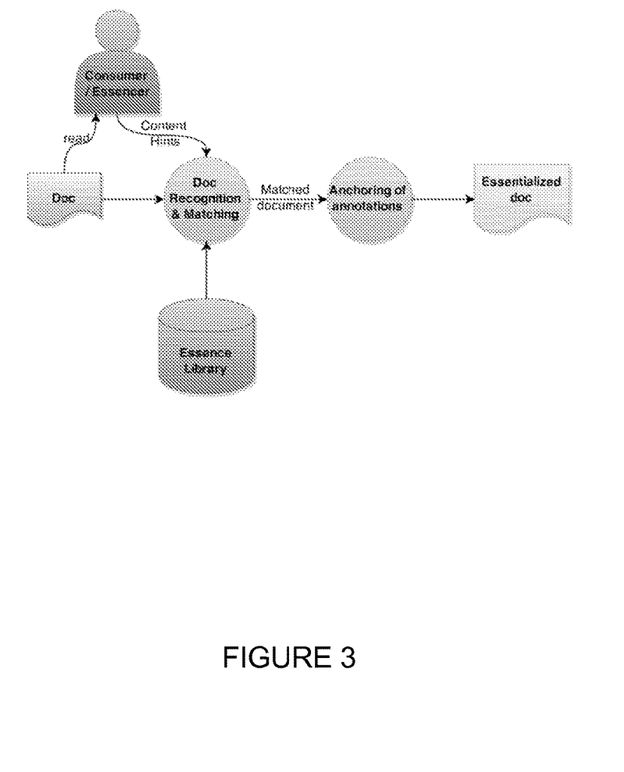
FIG. 3 illustrates a consumer selecting and applying an Essence Layer File from an online repository.

Referring now to FIG. 3, FIG. 3 illustrates a consumer selecting and applying an Essence Layer File from an online repository. The same content often exists in multiple embodiments, which can either be in multiple documents (e.g. as PDF with file name A and with file name B), in different content formats (e.g. as HTML and as PDF), in different device form factors (e.g. as HTML for Desktop and for smartphones), under different URLs, or embedded in other different content (e.g. the same news text can appear in a web page of newspaper 1 and of newspaper 2). There are existing algorithms that can identify and match documents in multiple embodiments and there are algorithms for anchoring existing annotations in various document formats. However there is no integrated mechanism that would span both and that would allow a human interaction in order to give hints for improving the matching algorithm. The Essence System offers a mechanism that integrates both, the automatic matching of documents in multiple embodiments and the automatic anchoring of existing annotations in various document formats. It also offers a human interaction for pointing at relevant parts in the content in order to give hints for improving the matching and the anchoring algorithm.

Figure 4:
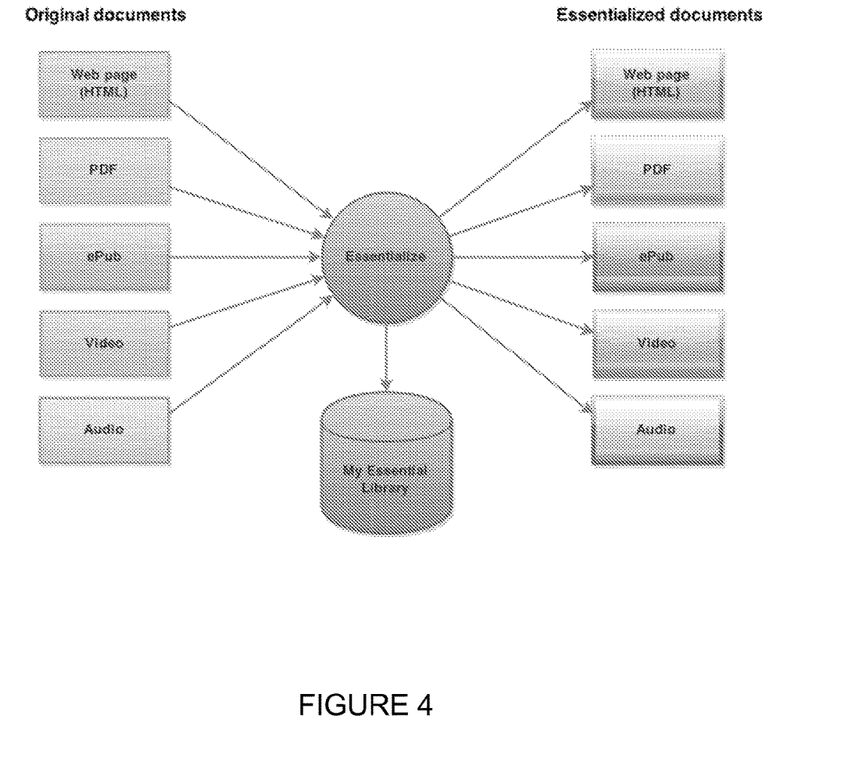
FIG. 4 illustrates essence original document formats.

Referring now to FIG. 4, FIG. 4 illustrates essence original document formats. FIG. 4 is self-explanatory.

Figure 5:
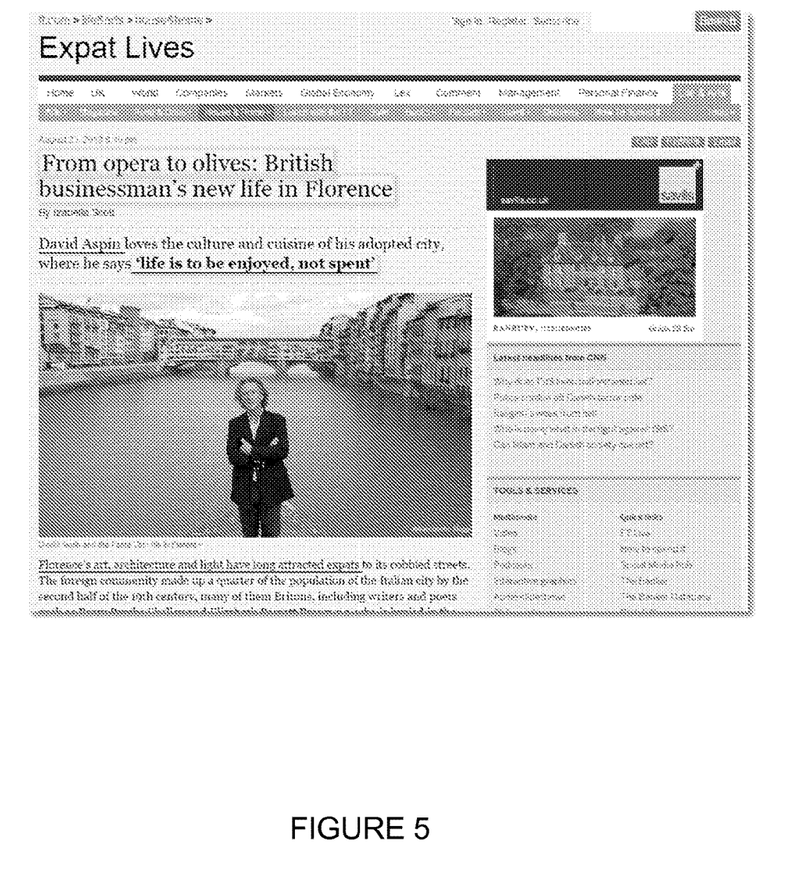
FIG. 5 is a pictorial illustration of essenced HTML content.

Referring now to FIG. 5, FIG. 5 is a pictorial illustration of essenced HTML content. The essenced HTML page displays multiple levels of essence annotation. Examples include: underlining, adjusting font size, and highlighting of various colors. Annotations come in multiple, graduated importance levels. Each progressing level would use increasingly conspicuous annotations. essencers would be encouraged to properly use importance levels through the rating system. essencers who creates questionable or misleading annotations or importance levels would become down-voted and their Essences would see less circulation.

Figure 6:
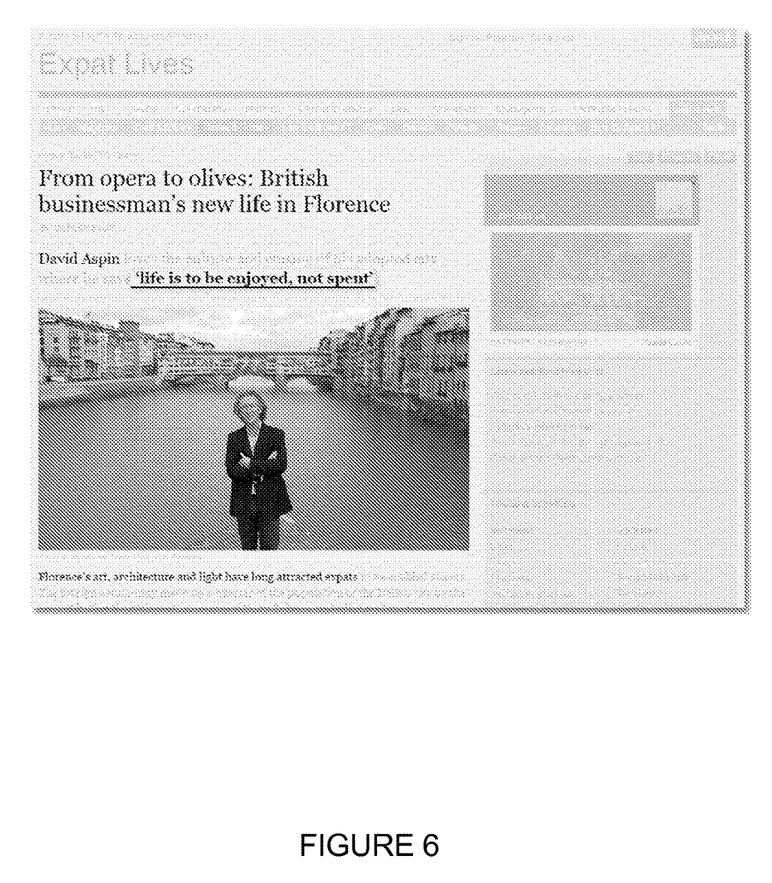
FIG. 6 is a pictorial illustration of essence HTML content with a muted background.

Referring now to FIG. 6, FIG. 6 is a pictorial illustration of essenced HTML content with a muted background. Similarly to FIG. 5, essenced HTML documents would appear to consumers with the Essence Layer File overlaid on the original electronic content; however, the Essence Layer File can be configured to obscure all content that has not been annotated. Obscuring non-annotated content could involve overlaying a color filter on top of the non-essential content. In an essenced ePub, chapters that did not have any annotations would also be obscured in the table of contents.

Figure 7:
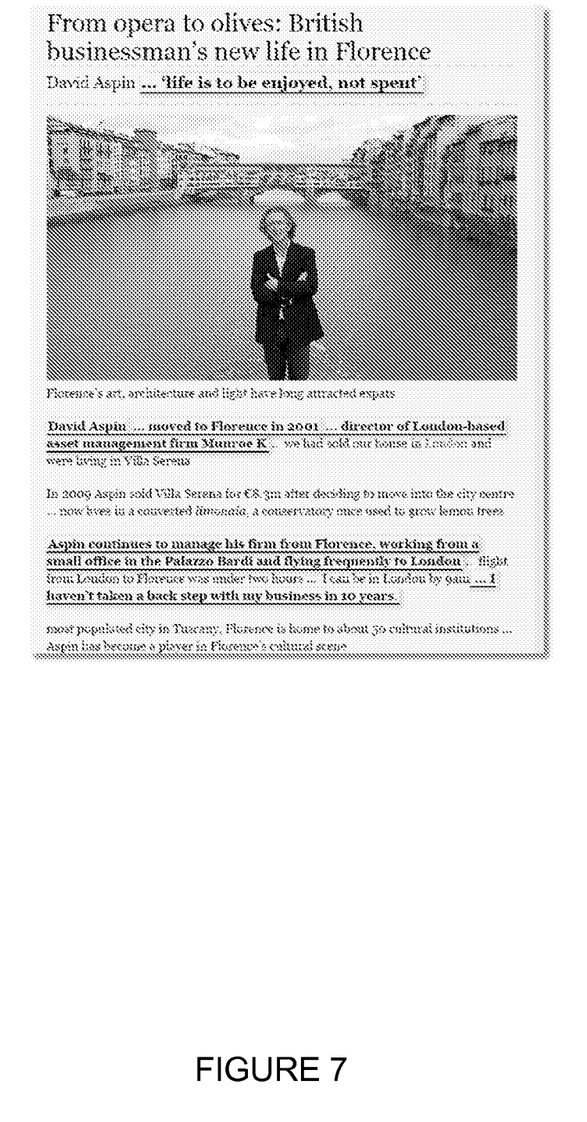
FIG. 7 is a pictorial illustration of essence HTML content wherein non-highlighted content has been removed.

Referring now to FIG. 7, FIG. 7 is a pictorial illustration of essenced HTML content wherein non-annotated content below a user-selectable importance level has been removed. Rather than obscuring non-annotated content, the non-annotated may be simply removed.

Figure 8A:
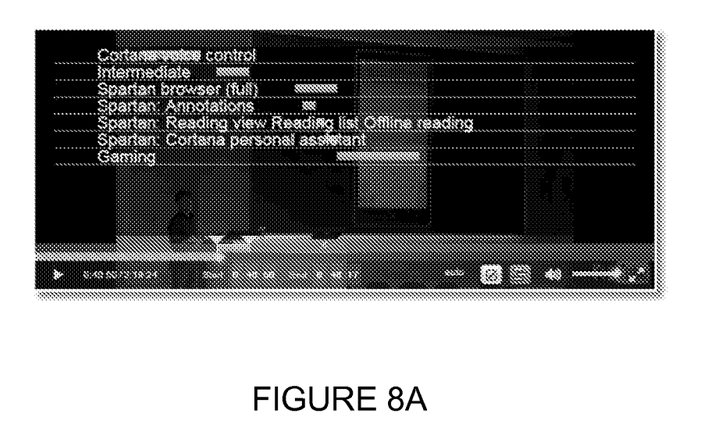
FIG. 8A is a pictorial illustration of essenced video content.
Figure 8B:
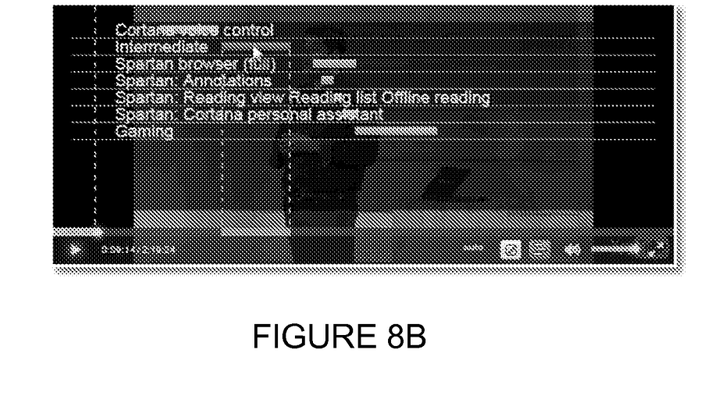
FIG. 8B is a pictorial illustration of a selected portion of essence video content.

Referring now to FIGS. 8A and 8B, where FIG. 8A is a pictorial illustration of essenced video content and FIG. 8B is a pictorial illustration of a selected portion of essence video content. Moving the mouse over the list illuminates the time frame of the annotation: Clicking on a highlight starts play back of that portion. Clicking on the "Play all highlights" plays back the highlighted parts of the video all non-highlighted parts are either not played at all or are played back in very high speed (fast forward). Furthermore user can filter the list according to importance levels of annotations thus allowing to play only the most important parts. Audio recordings are similar to videos, where the individual audio pieces are highlighted. The functionality also is the same.

Creating Essences for videos can be a cumbersome and time-consuming task, so quick hot controls should be established to aid in the task. A key function is positioning the current video cursor and setting start and end points of annotations. When the essencer watching the video reaches a part in the video that he/she wants to create an annotation for, then the essencer needs to find the correct start and end points for the annotation. This may require going forth and back in the video several times to identify the ideal start point. Some embodiments support this special need by offering the keyboard and mouse/touch control functions in Table 1 below

TABLE 1

| Function | Key | Mouse/Touch |
| --- | --- | --- |
| Start and stop replay | SPACE | Push play button |
| Move time cursor left or right 1 sec | <and> | Drag cursor |
| Move time cursor left or right 10 sec | SHIFT-<and SHIFT-> | Drag cursor |

TABLE 1-continued

| Function | Key | Mouse/Touch |
|---|---|---|
| Create new annotation at current cursor | n | Push new annotation button |
| Set start annotation at current cursor | i | Drag left annotation handle |
| Set end annotation at current cursor | o | Drag left annotation handle |
| Edit text of current annotation | t | Click/touch annotation bar in control area |

When the cursor or the left or right annotation handles are moved by mouse/touch or by keyboard, then the times are temporarily displayed above the corresponding element. The essencer may also create temporary markers. While watching the video, the essencer might want to mark interesting positions in the video in order to create annotations later on. User interface offers a function to setting temporary markers at the current cursor position, that could be done simply using the "new annotation" function and not setting an end.

Navigating essenced video content would also have special controls. Sample controls are provided in Table 2 below.

TABLE 2

| Function | Key | Mouse/Touch |
|---|---|---|
| Position to an annotation | Up and Down | Click on an annotation in the Highlights list |
| Position to the next annotation | Down | Click on the next annotation in the Highlights list |
| Position to the previous annotation | Up | Click on the previous annotation in the Highlights list |
| Jump to the start of current annotation | s | Push/touch the left annotation handle in the control area |
| Jump to the start of current annotation | e | Push/touch the right annotation handle in the control area |

Once created, essenced video content would require an identifying image or animated image. Each annotation can have one or more images that serve as identifying images. For a given annotation the user interface automatically suggests several images from which a user can select one or more identifying images. The selected images would be automatically transformed into a minimal size image (in case of a single image) or into an animated GIF or another animated image format (in case of multiple images). Additionally the user interface offers the essencer to choose the identifying image for the Essence by offering options for the selection. Such options include: one single static image out of all identifying images of all annotations, one animated image (e.g. animated GIF) out of the animated identifying images of all annotations, or an animated image (e.g. animated GIF) created of all identifying images of all annotations.

An additional use of annotations in essenced video or audio content would involve nested annotations. Nested annotations are those found within other, larger annotations.

Figure 9:
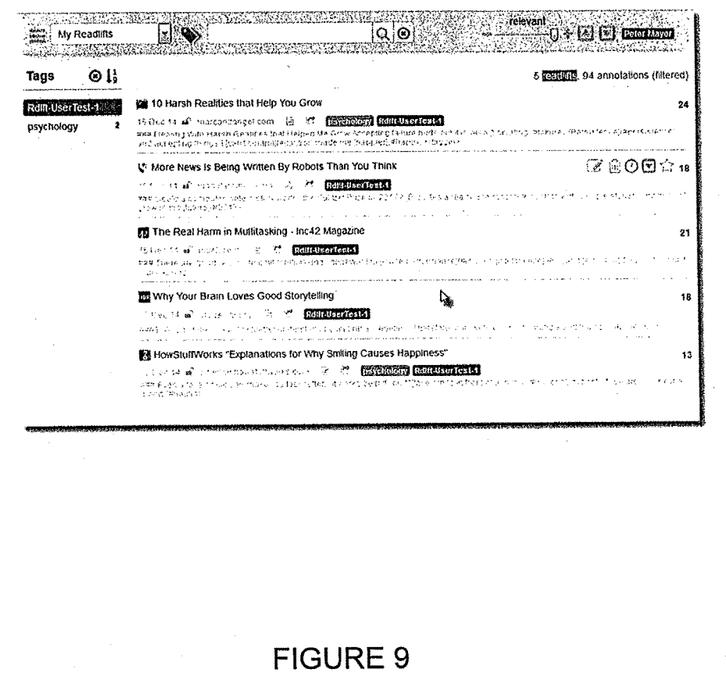
FIG. 9 is a pictorial illustration of a feed of essenced HTML content sorted by creation date.

Referring now to FIG. 9, FIG. 9 is a pictorial illustration of a feed of essenced HTML content filtered by certain user-selectable criteria like subject tag, search string, creating user and sorted by several user selectable sorting criteria like creation date. Users of the feed of essenced content would be presented with a plurality of essenced content stored in an Essence Library. The Essence Library would present consumers with essenced content attuned to that consumer's own personal preferences and ratings. If multiple Essences on given content were available and rated highly enough, the Essence Library could optionally present these as a single entry. Each entry would contain either the essencer's written purpose statement, or only those annotations with the highest level of importance. Additionally, this Essence Library would show tags associated to the Essences. The Essence Library can also be searched with a search bar and allows for offline viewing of essenced content.

Figure 10:
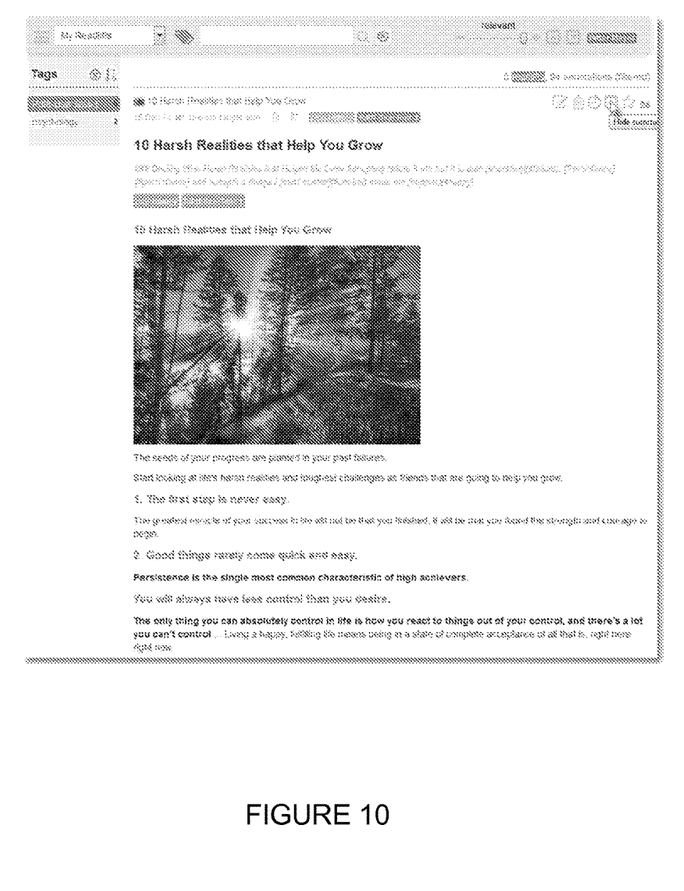
FIG. 10 is a pictorial illustration of essenced HTML content accessed from an Essence Library.

Referring now to FIG. 10, FIG. 10 is a pictorial illustration of essenced HTML content accessed from an Essence Library. When accessing essenced content from the Essence Library, a consumer is provided with special controls on the top of the user interface. These controls allow for operations such as filtering essenced content according to importance levels or rating essencers.

Figure 11:
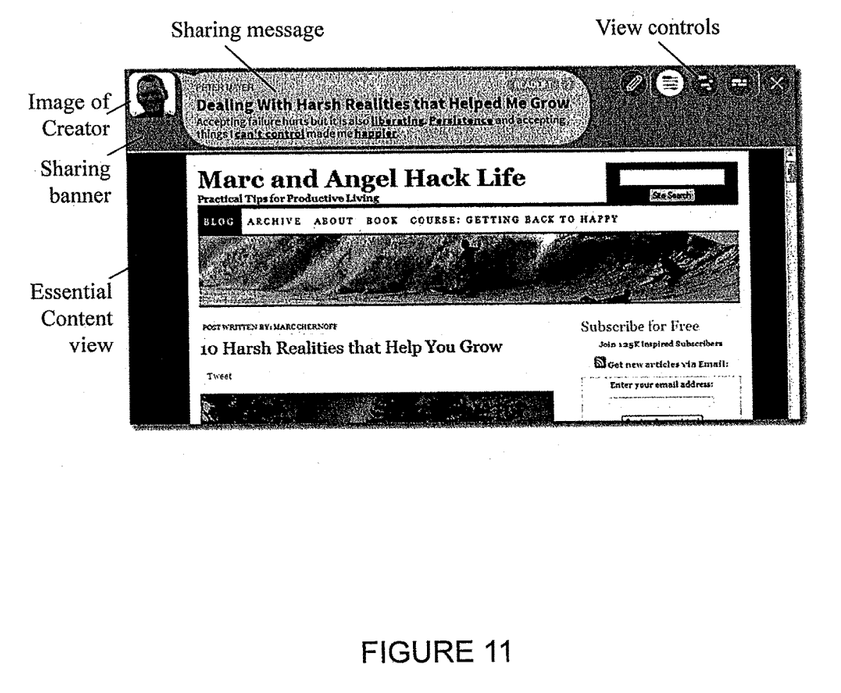
FIG. 11 is a pictorial illustration of a essence HTML content displayed with a Essencer info.

Referring now to FIG. 11, FIG. 11 is a pictorial illustration of a essence HTML content displayed with essencer info. In one embodiment, when an Essence is shared and a recipient (consumer) navigates to the shared link, the opens the sharing view of an Essence. At the top of the sharing view is the sharing banner, which includes an image of essencer (or an avatar image), a sharing message which commonly would be the purpose message of the Essence but which can be modified, and finally the sharing banner could contain links to external resources or to annotations in the content (as shown in the image above). The view controls allow the consumer to select one content view of the Essence (as shown in FIG. 5 to FIG. 7). An optional discussion stream which can be shown or hidden and which is usually located at the bottom or the right side of the page (not pictured).

Figure 12:
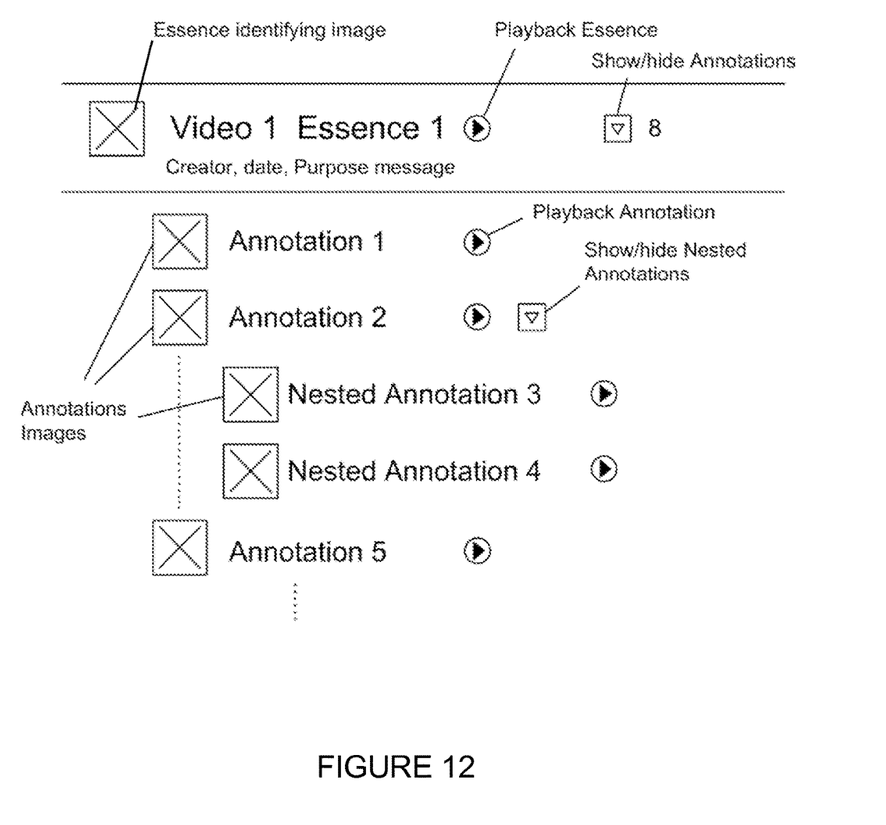
FIG. 12 is a user interface illustration for essenced video and audio content.

Referring now to FIG. 12, FIG. 12 is a user interface illustration for essenced video and audio content. Video or audio content would also be displayed in the Essence Library. The entry would contain basic information included in an Essence, as well as a drop down pane which would include individual annotations, and nested annotations, all of which could be played individually.

An integration of an essence file viewing application with external applications and reading devices can be very useful for multiple purposes, for example, in order to display Essence information in the external applications or reading devices or open content that is loaded in external applications in the presently invented system in order to create or consume essenced content execute other functions of integration. Accordingly, the essence viewer would integrate with external applications and devices such as Evernote, Email clients like Outlook and Mozilla Thunderbird, Microsoft Office applications like Word, eBook Reader apps and devices, web browsers, and other suitable applications known in the art.

The invention claimed is:
1. A method comprising:
receiving electronic content,
generating an essence layer file that includes annotations for the electronic content, the annotations including highlights or comments to the portions of the electronic content that a user deems of importance, the essence layer file includes sub-layers each having an importance level characteristic;

anchoring the essence layer file to the electronic content such that the essence layer file overlays on top of the electronic content and annotations match up to the portions of the electronic content that a user deems of importance;

publishing the essence layer file with the electronic content to an Internet database;

receiving a user selection of a given importance level associated with the importance level characteristic; and deactivating display of all sub layers of the essence layer file that are below an associated importance level characteristic threshold based on the selected importance level and all portions of the electronic content that do not include annotations.

2. The method of claim 1, wherein the Internet database of essence layer files is searchable.

3. The method of claim 1, further comprising:
receiving, at the Internet database, user submitted ratings for particular essence layer files.

4. The method of claim 1, further comprising:
reorganizing a formatting of the electronic content such that portions of the electronic content that are deactivated from display do not take up display space.

5. A method comprising:
receiving a plurality of electronic content, each electronic content having one or more anchored essence layer files, wherein an essence layer file including annotations for the electronic content, the annotations including highlights or comments to the portions of the electronic content that a user deems of importance, the essence layer files including sub-layers each having an importance level characteristic;

providing a user interface for evaluating the quality of the one or more anchored essence layer files;

sorting evaluations of the quality of the one or more anchored essence layer files by creator;

displaying electronic content with anchored essence layer files having creators with high evaluations; and deactivating display of all sub layers of the anchored essence layer files that are below an associated importance level characteristic threshold based on the selected importance level and all portions of the electronic content that do not include annotations.

6. A system comprising:
a content file, the content file including legible material for human consumption represented in digital form;

a content file viewer instantiated on an electronic device, the content file viewer including a user interface having at least a visual component and user input mechanism, wherein a user is enabled to view the content file and navigate through the file on the electronic device and select an importance level;

an overlay file, the overlay file displayed on the electronic device with the content file in the content file viewer, wherein the overlay file is visually displayed by the electronic device on top of the content file and is at least partially transparent, the overlay file further including user interface features that cause highlighted regions to appear on the overlay file positioned visually above the legible material of the content file, the overlay file including sub-layers each having an importance level characteristic; and wherein the content file viewer deactivates display of all sub layers of the overlay file that are below an associated importance level characteristic threshold based on the selected importance level and all portions of the content file that do not include annotations.

7. The system of claim 6, where the content file viewer is an Internet browser program including a plugin, the plugin for displaying the overlay files.

8. The system of claim 6, where the content file is a written article.

9. The system of claim 6, where the content file is a video file.

10. The system of claim 6, where the content file is an audio file including a visual, multi-media control bar.

11. The system of claim 6, wherein the content file viewer is further configured to reorganize a formatting of the electronic content such that portions of the content file that are deactivated from display do not take up display space on the user interface.

* * * * *